United States Patent [19]

Schommer

[11] Patent Number: 5,315,859
[45] Date of Patent: May 31, 1994

[54] CUSTOM FLOW RESTRICTOR

[76] Inventor: John Schommer, 2040 Winsome Way, Encinitas, Calif. 92024

[21] Appl. No.: 902,722

[22] Filed: Jun. 23, 1992

[51] Int. Cl.$^5$ ............................................. F15D 1/00
[52] U.S. Cl. ........................................... 73/3; 138/44
[58] Field of Search ................... 73/3, 861.42; 138/40, 138/41, 42, 44, 45; 210/118, 428, 431, 437, 438, 439; 239/408, 451; 62/511, 527

[56] References Cited

U.S. PATENT DOCUMENTS

| | | | |
|---|---|---|---|
| 1,662,374 | 3/1928 | Woodmansee | 138/44 |
| 1,744,842 | 1/1930 | Suverkrop et al. | 138/44 |
| 2,271,982 | 2/1942 | Van Kreveld | 138/44 |
| 2,939,487 | 6/1960 | Fraser et al. | 138/45 |
| 2,975,478 | 3/1961 | Finster | 138/44 |
| 3,999,714 | 12/1976 | Lang | 138/44 |
| 5,184,641 | 2/1993 | Kuhn | 138/41 |
| 5,209,265 | 5/1993 | Taguri et al. | 138/45 |

FOREIGN PATENT DOCUMENTS 199135  10/1938  Switzerland ........................ 138/40

Primary Examiner—Robert Raevis
Attorney, Agent, or Firm—Ralph S. Branscomb

[57] ABSTRACT

A set of selectable custom water flow restrictors is provided to limit water flow to a predetermined selected gallons-per-minute rate. The restrictor is inserted in-line upstream of the faucet, shower or other water appliance to which water passing through the line is delivered. The restrictor has upstream and downstream chambers connected by a restricting orifice, with the chambers being specially designed to eliminate noise from the restrictor, and to cause the restrictor to be self-cleaning. A downstream water pulse-hammer mitigation disc may be used in conjunction with the main portion of the restrictor in appropriate circumstances.

3 Claims, 1 Drawing Sheet

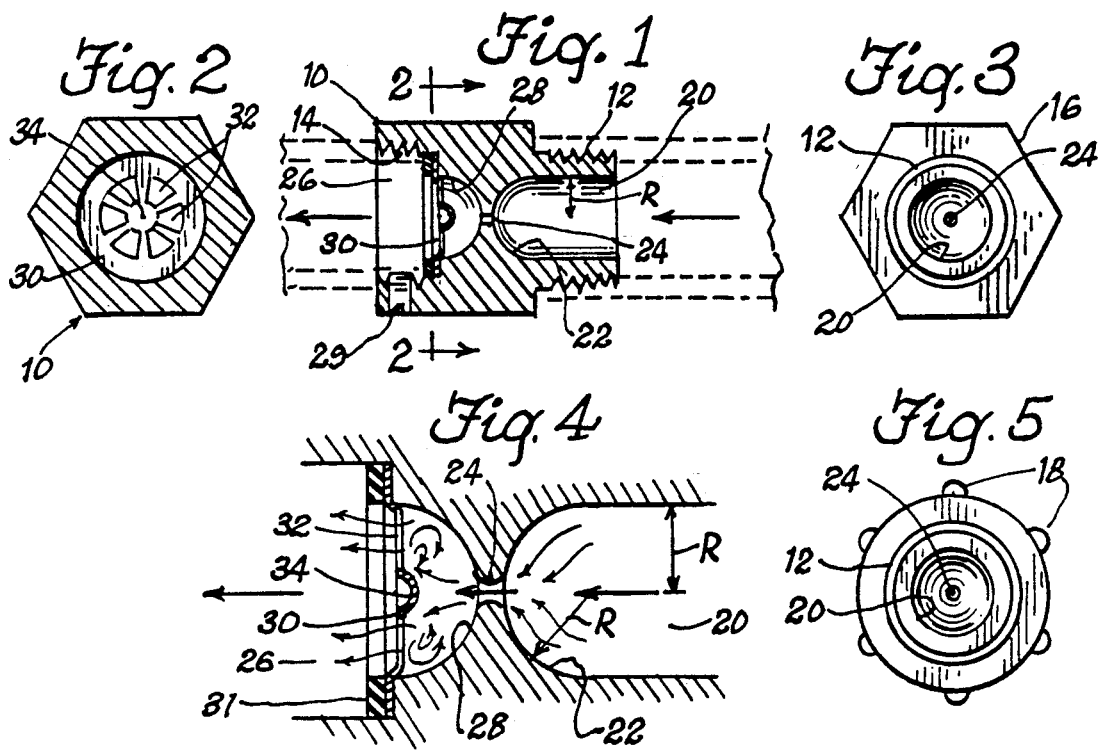
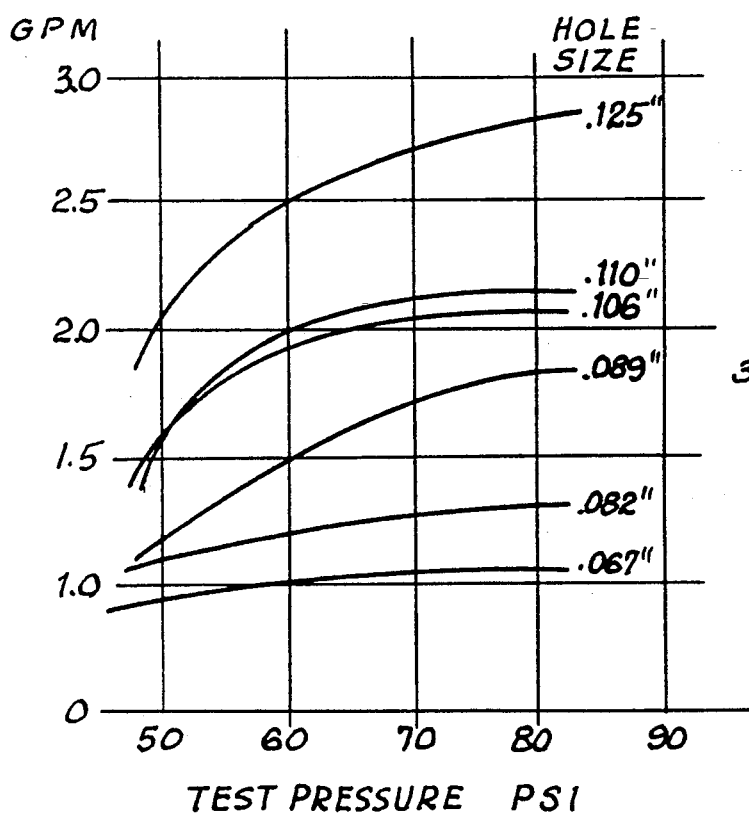
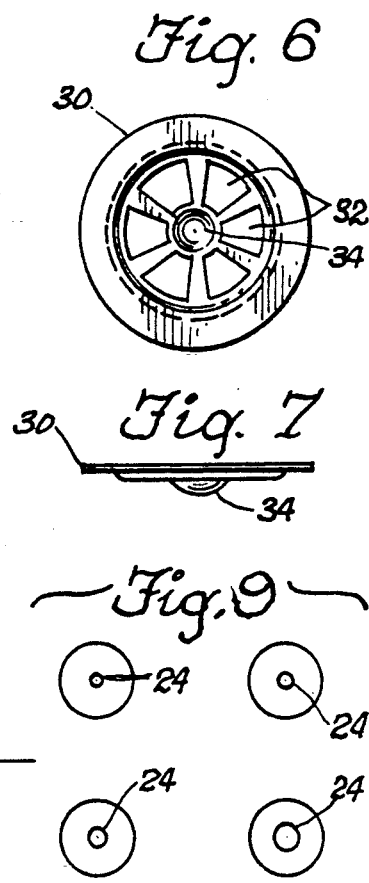
Fig. 8 FAUCET RESTRICTOR VALVE

CUSTOM FLOW RESTRICTOR

BACKGROUND OF THE INVENTION

As the human population increases almost everywhere, the population pressure on the water supply is increasingly felt, especially in arid, desert regions of which Southern California is archetypal. Almost all of the water in Southern California is imported by aqueduct either from Northern California, or from the Colorado River in Arizona.

To appreciate this invention it is important to know that at the time of this writing, several years of severe drought have caused a critical water shortage in Southern California. Many Southern California cities instructed residents not to water their greenery, and to simply let their lawns die. Some cities had water policemen whose specific duty was to patrol the city checking for unauthorized landscape watering. Cities passed out water restricting showerheads to replace older ones, and gave considerable rebates to owners who replaced their conventional toilets with special water saving toilets.

In a nutshell, it became apparent in Southern California that conventional plumbing equipment and techniques could not adequately accomplish the needed water conservation. This problem is also faced in many other areas of the world. Thus, flow restrictors, often built into an appliance such as showerheads, began to be put into service recently. Some flow restrictors, for example those used on faucets, are put right on the dispensing nipple of the faucet, and are easily removed by disgruntled occupants. Most restrictors are subject to becoming clogged, causing their simple removal without replacement in many instances. Any such restrictor or shower head with a built-in flow limitation in its design is subject to becoming clogged with particulates in the water supply, and also, in some cases, to creating a considerable hissing noise in the water lines.

There is a need for a means and method for restricting water flow in a traditional plumbing system which is quiet, self-cleaning and clearing, simple to install, and easily installed out of sight or reach of the water consumer to prevent its arbitrary removal by those who prefer to use water in wasteful quantities. Those who do not pay for the water, such as apartment renters and motel/hotel guests, are notorious for this.

SUMMARY OF THE INVENTION

The instant invention fulfills the above-stated need and provides a simple nut having a tapered male upstream end and a similarly tapered female downstream end, so that it may be inserted in a number of places in the plumbing system up-stream of the water dispensing fixture. For example, under sinks, or behind the wall of a shower.

Both the upstream and downstream ends of the body of the device incorporate a water pass-through chamber which is hemispherical, having the same radius as the water inlet in the body of the restrictor. The hemispherical configuration both upstream and downstream, with the two hemispheres being connected by the restricting orifice, has proven itself to be completely self-cleaning, substantially noiseless, and due to its substantial symmetry, is reversible in the line to accommodate the dictates of any pre-installed plumbing.

BRIEF DESCRIPTION OF THE DRAWINGS

FIG. 1 is a longitudinal section taken through the restrictor indicating the direction of water flow therethrough;

FIG. 2 is a section taken along line 2—2 of FIG. 1 with the optional water mixer in place;

FIG. 3 is an end elevation view from the right end of FIG. one;

FIG. 4 is an enlarged, somewhat diagrammatic longitudinal section illustrating water flow through the restrictor with the water mixer in place;

FIG. 5 is an end elevation view of the right end of the restrictor of FIG. 4, which is made of a tough plastic such as Delrin TM or Nylon TM;

FIG. 6 is a front elevation view of the water spreader which reduces water pulse-hammer;

FIG. 7 is an edge view of the water mixer of FIG. 6;

FIG. 8 is an illustrative graph illustrating water flow as a function of line pressure and orifice size to help in the selection of a suitable restrictor; and FIG. 9 illustrates a small but typical set of the restrictors having differently sized orifices to achieve different levels of water flow.

DETAILED DESCRIPTION OF THE PREFERRED EMBODIMENT

The invention is best shown in its overall configuration in the longitudinal section of FIG. 1. The restrictor has a body 10 having an upstream male tapered threaded coupling nipple 12, and a downstream tapered threaded females coupling 14. The two couplings fit together such that the water line can be interrupted at a convenient coupling or junction, with the restrictor body 10 inserted at the interruption.

The body 10 may be made of brass, with a wrench-tightenable exterior surface as shown in FIG. 3 at 16. In the event that the body is made of a tough plastic such as Nylon TM, Delrin TM, or any of a number of other tough, moldable plastics, the logical exterior configuration would be manually rotatable ribs 18 as shown in FIG. 5. Of course, the plastic could also have a hexagonal wrench-operable exterior like the brass embodiment illustrated in FIG. 3.

The upstream coupling 12 defines an internal water-receiving chamber 20, the inlet portion of which defines a radius "R". This radius is continued downstream to the hemispherical end portion 22 of the upstream chamber, which communicates through a restrictive orifice 24 to a similar downstream chamber 26, which similarly defines a hemispherical upstream end of the downstream chamber 28. The body may have a set screw 29 penetrating the downstream chamber 28 to enable the fitting to be engaged on a hose bib with the set screw tightened to ward off casual removal of the restrictor.

Although other configurations of the chambers 20 and 28 are virtually unlimited, tapered configurations have proved ineffective compared to the hemisphericai contour in both virtually eliminating noise, and even more importantly in causing the fitting to be substantially self-cleaning. The hemispherical shapes of both chambers cause water eddy currents to occur, cleansing the entire surfaces of both of the chambers such that only in a very rare instance would the fitting clog and require removal and cleaning.

The orifice 24 could be faired into the surfaces of the adjoining chambers 20 and 28 as shown in FIG. 4, or it could be bored straight through as indicated in FIG. 1.

Clearly the straight bore is easier to make and is thus more economical. As shown in the respective restrictors of FIGS. 1 and 4, the orifice may vary considerably in size.

The restrictors are ordinarily offered as a set from which the buyer selects the appropriate size. A set of 18, ranging in water delivery rate in one-quart increments from two quarts per minute to 19 quarts per minute, is currently being used to promote the product. A smaller illustrative version of such a set is shown diagrammatically in FIG. 9.

In a typical promotional set of restrictors, the orifices vary in size as, for example, listed in the graph of FIG. 8. This graph correlates water flow with the line pressure and the desired orifice size. Such a graph, or a set of tables carrying similar information, allows the system designer or modifier to first select the number of gallons per minute of water flow that is desired through the system, then measure or otherwise determine the line pressure in pounds per square inch as illustrated along the bottom the graph of FIG. 8.

When this information is known, it is a simple matter to select the restrictor having the optimally sized orifice. For example, if a system designer wanted a two gallon-per-minute water flow through a particular line and the line pressure measured 70 pounds per square inch, a restrictor having an orifice of 0.106 inches would come the closest to providing the desired flow, within about 5%. Although the quickest and simplest way to select the proper restrictor is by use of a graph or set of tables, it could be done by trial and error as well, inserting a particular restrictor in the line and measuring the actual gallons per minute that flows through the line with the restrictor in place.

The purpose of offering the variety of sizes in the set, therefore, is to enable the buyer to pick the correct size for the application, which might require several hundred or thousand units of the same size. The desired quantity of restrictors is then custom-drilled from a stock of restrictors having the smallest orifice, from whence came the name "Custom Flow Restrictor".

Another feature of the invention is shown in several of the figures. This feature involves water hammer or pulse. Water hammer occurs when the water is shut off as a result of water inertia, and water pulse occurs when pockets of water occur in the lines and hit the faucet to cause a knocking/hissing noise. These two phenomena are combined into the term "pulse-hammer" in this disclosure.

Water pulse-hammer mitigation specifically involves use of the water mixer disc 30 which is preferable on the downstream end of the body of the restrictor inside the gasket 31, within the downstream coupling 14 as shown in FIGS. 1 and 4, or it could be put on the other end of the fitting if the restrictor is put in the line in reverse. The purpose of the disc 30 is to reduce or eliminate water pulse-hammer. The disc is recommended if the distance between the restrictor and the faucet, shower head or other dispensing appliances is more than about 3 feet. The disc has been shown in practice to be very effective.

The restrictor may come in a variety of configurations, but that shown and used on the models has a plurality of radial aperture sectors 32. Central of these aperture sectors is a dispersion dimple 34.

Although it is not entirely understood how the water mixer disc 30 eliminates water pulse-hammer, test results have shown that it does. It is believed that this occurs because in the absence of the water mixer, a narrow powerful stream of water passing through the orifice 24 tends to create a vacuum or air pocket on the downstream of the orifice as the high momentum of the water carries it past the hemispherical portion of the downstream chamber. However, the water mixer disc 30, rather than permitting the unrestricted jetting of this narrow stream, breaks it up and causes a very dense spray to occupy the downstream chamber. This dense spray, which is largely water but also contains vacuum and/or water pockets, serves as a shock absorber to minimize water pulse-hammer when the fixture is turned off and the air pocket or vacuum rapidly collapses.

Although the invention is simple, it fulfills a well-known important need, and solves several problems which have caused prior devices to be unsatisfactory or difficult to use, or impractical. The self-cleaning feature, coupled with the quietness of operation and the difficulty of casual removal of the device makes it ideal in many ways for use in achieving its designated purpose in arid regions of the world.

It is hereby claimed:

1. For use upstream of a water dispensing fixture, a flow restrictor for insertion in-line in a water line connected to a water dispensing fixture to restrict the water flow through the line, said restrictor comprising:
    (a) an in-line restrictor body;
    (b) said body having a longitudinal flow passageway and an upstream coupling and a downstream coupling for coupling said body into a water line, said couplings comprising a means to couple the restrictor into a potable water line;
    (c) said body defining an upstream water-receiving chamber and a downstream water passing chamber;
    (d) an orifice of selectable restrictive diameter between said chambers to limit the flow of water in said passageway; and
    (e) each of said chambers being radiused substantially spherically adjacent said orifice with a radius substantially equal to the radius of the respective chambers at cross-sections spaced from the spherical portions, said water-receiving chamber and downstream chamber being substantially identical in volume, and said restrictor being reversible such that said upstream coupling can be coupled in a water lien downstream.

2. A restrictor according to claim 1 wherein said restrictor is one of a set of substantially identical restrictors except each having a differently-sized orifice varying in diameter from on the order of 0.067 inches to on the order of 0.125 inches to define a plurality of selectable levels of flow restriction in said body, each of the orifices in each of said restrictors being smoothly faired into the surfaces of both of said respective chambers.

3. A restrictor according to claim 1 and including a water mixer disc seatable in said downstream chamber of said body and having a plurality of spaced radial sector openings to break up water flow downstream of said body to mitigate against air pulse-hammer, said disc including a central upstream-convex dimple to deflect a water stream directed through said openings.

* * * * *